United States Patent

[11] 3,567,861

[72] Inventors Darrow L. Webb
Cocoa;
Francis Byrne, Cocoa Beach, Fla.
[21] Appl. No. 782,956
[22] Filed Dec. 11, 1968
[45] Patented Mar. 2, 1971
[73] Assignee the United States of America as represented by the Administrator of the National Aeronautics and Space Administration

[54] VIDEO/SYNC PROCESSOR
2 Claims, 2 Drawing Figs.

[52] U.S. Cl. .......... 178/69.5
[51] Int. Cl. .......... H04n 5/04
[50] Field of Search .......... 178/69.5 (TV), 69.5 (F), 6.6 (A), 5.4 (CR)

[56] References Cited

UNITED STATES PATENTS 2,979,557 4/1961 Schroeder .......... 178/6.6(A)
3,029,306 4/1962 Dolby .......... 178/6.6(A)

*Primary Examiner*—Richard Murray
*Attorneys*—James O. Harrell and G.T. McCoy

ABSTRACT: A video sync processor which includes a phase locked loop which compares the horizontal sync of an incoming video signal to the horizontal sync of a local sync generator and thereby locks a voltage control oscillator of the processor to a master oscillator carried in the remote transmitting station. In this manner all local processing equipment is referenced to the remote master oscillator. Frequently, when signals are received from remote stations, such as spacecrafts, there is a low signal-to-noise ratio and the quality of the signal is poor. In order to improve the stability of the composite signal the sync and blanking portion are stripped from the incoming video signals and a clean sync and blanking signal from the local sync generator is inserted therein. Therefore, as long as horizontal phase-lock is maintained all ground recording and monitoring equipment are presented with video and clean sync regardless of the signal-to-noise ratio of the signal received.

Figure 1:
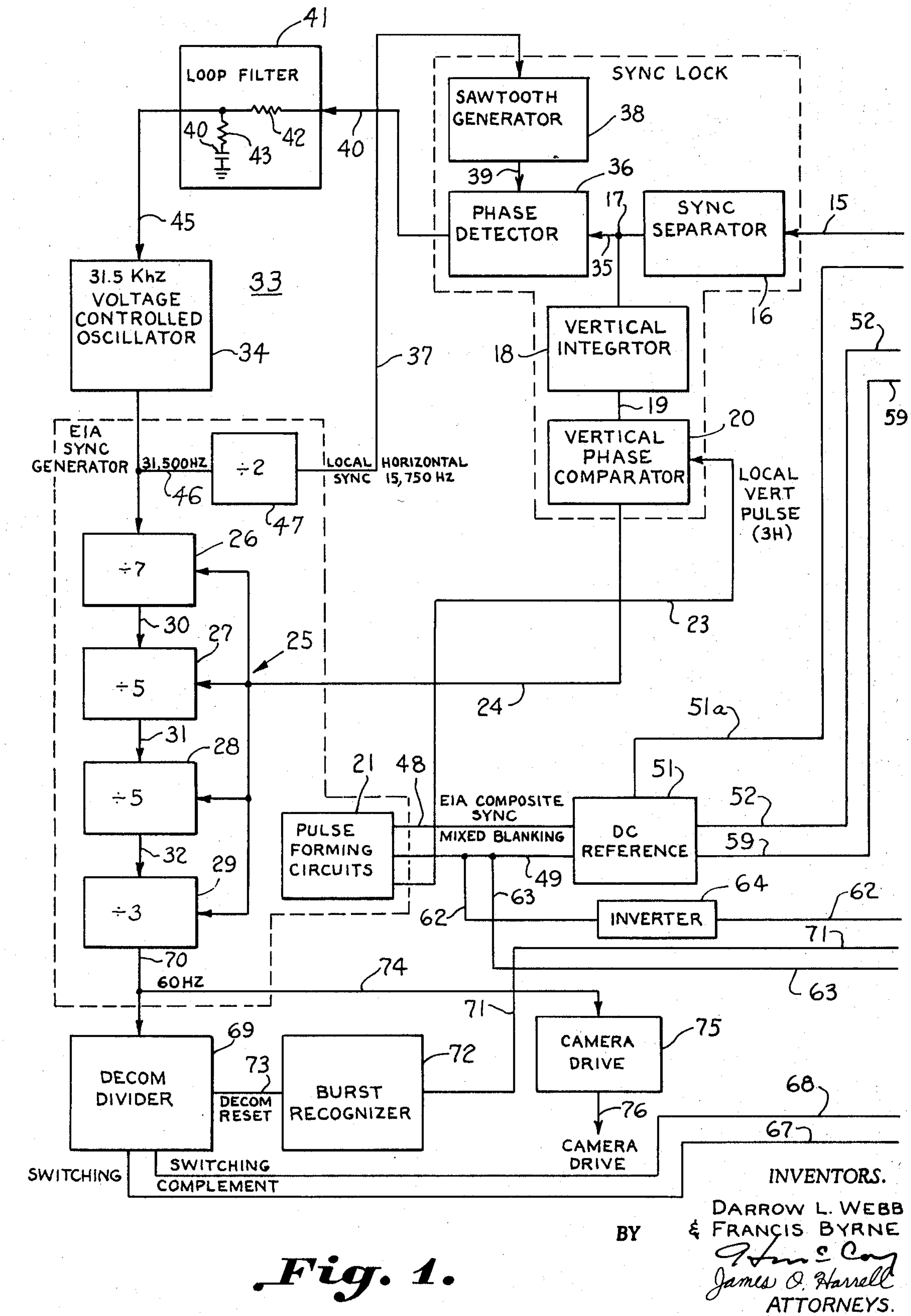

INVENTORS.
DARROW L. WEBB
& FRANCIS BYRNE
BY
ATTORNEYS.

INVENTORS.
DARROW L. WEBB
BY & FRANCIS BYRNE
James O. Harrell
ATTORNEYS.

VIDEO/SYNC PROCESSOR

The invention described herein was made by employees of the U.S. Government, and may be manufactured and used by or for the Government for Governmental purposes without the payment of any royalties thereon or therefor.

This invention relates to a video/sync processor, and more particularly to a processor which will improve the stability of a video signal received from a remote station, such as a spacecraft, so that such can be monitored or recorded for subsequent play-back. One of the problems in receiving video signals from remote stations, such as satellites or space vehicles is that frequently the received signal exhibits a low signal-to-noise ratio. This interferes with presenting a useable video signal to local TV monitors and tape recorders. A system is therefore, required which can maintain synchronism over an extremely wide range of input signal levels.

In accordance with the present invention, it has been found that difficulties encountered in processors for receiving remote video signals may be overcome by providing a novel system which removes the vertical and horizontal sync portions from the composite remote video signal and substitutes a new clean sync signal portion therefor. This system includes the following basic parts: (1) a sync separator, (2) means for supplying the remote composite signal to the sync separator for separating the horizontal and vertical sync signal portions from the composite signal, (3) a local sync generator provided for producing local sync and blanking signals, (4) a voltage controlled oscillator coupled to the input of the local sync generator for providing an input signal thereto, (5) a phase detector coupled to the output of the sync separator for receiving the horizontal sync portion of the remote composite signal, (6) means for supplying a local horizontal sync signal to the phase detector to be compared with the horizontal sync portion from the remote composite signal, (7) the phase detector generates an output signal indicating the frequency difference between the local horizontal sync and the horizontal sync from the remote signal, (8) means for coupling the signal indicating the frequency difference to the voltage controlled oscillator for changing the frequency of the voltage control oscillator to make the local sync generator come back in phase with the remote horizontal sync signal, (9) a video switcher having input means for receiving the blanking pulses, the sync signals, and the remote composite signal and, (10) means coupling the local sync and blanking signals from the sync generator to the video switcher for combining the local sync and blanking signals with the video portion of the remote composite video signal. The means for coupling the signal indicating the frequency difference to the voltage control oscillator includes a loop filter which makes it possible for the local sync generator to automatically reassume a locked condition with the remote video input almost instantaneously after the loss of sync signal occurs and such reappears.

Accordingly, it is an important object of the present invention to provide a video sync processor which is capable of processing and improving reception of a composite video signal received from a remote station.

Another important object of the present invention is to provide a video sync processor which removes the sync portion of a signal received from a remote signal and reinserts a clean sync and blanking portion into the composite signal.

Still another important object of the present invention is to provide a video sync processor which automatically assumes a locked condition between a local sync generator and the sync portion of a remote video signal under extreme variations in input signal-to-noise ratio.

Still another important object of the present invention is to provide a video sync processor which is very flexible and is capable of improving reception of composite video signals which have an extremely large dynamic range of signal levels.

Figure 2:
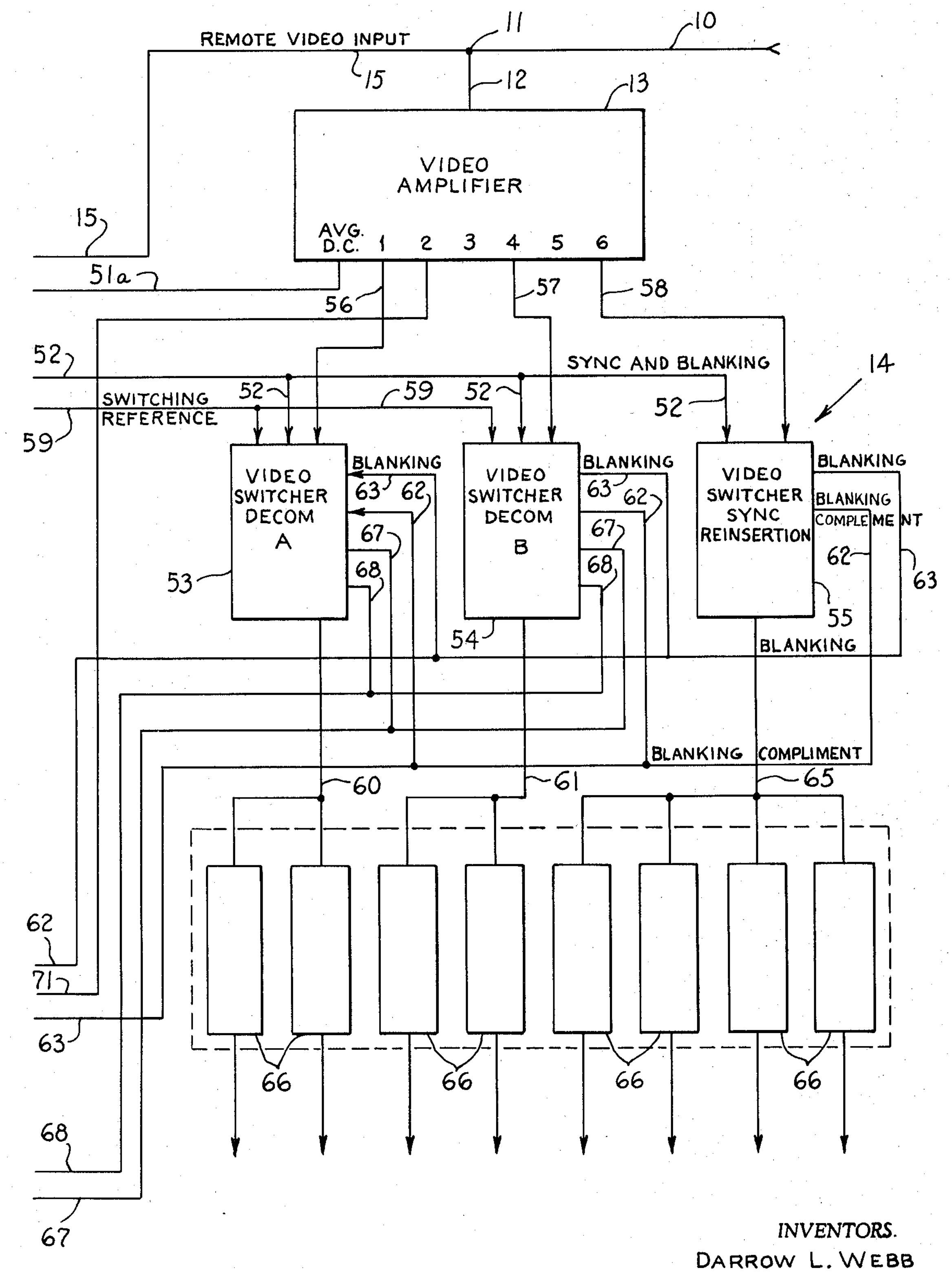

Other objects and advantages of this invention will become more apparent from a reading of the following detailed description and appended claims taken in conjunction with the accompanying drawings wherein:

FIG. 1 is a schematic diagram, partially in block form, illustrating a portion of a circuit incorporating the principles of the present invention, and FIG. 2 is a continuation of the schematic diagram illustrated in FIG. 1, which when taken therewith, illustrates the entire schematic circuit.

Referring in more detail to the drawings wherein like reference numerals designate identical or corresponding parts throughout the view, reference numeral 10 generally designates an antenna or input lead upon which a composite video signal is received from a remote station, such as a space vehicle or satellite. It is desired that the quality of this composite signal be improved by removing the sync portion of such therefrom, and reinserting a clean sync supplied from a local sync generator. The reconstructed composite signal is then fed to any desired receiver, such as video monitors, tape recorders, etc., without the adverse effect of signal jitter which normally accompanies video signals having a poor quality sync portion. The incoming remote composite video signal takes two paths at junction 11. One path goes through lead 12 into a video amplifier 13 and subsequently into any suitable conventional video switchers, generally designated at 14, which can decommutate the signal if such is necessary and reinsert a clean sync and blanking portion therein, or if the incoming video signal does no not need to be decommutated the remote signal is merely reconstructed by removing the old sync and reinserting a local sync and blanking signal therein. The purpose of the composite signal taking a separate path through lead 15 is to synchronize the local sync signals with the sync signals portions of the remote composite video signal so that such can be properly reinserted into the composite signal in the video switchers 14.

As the composite signal passes through lead 15 it is fed into any suitable conventional sync separator 16 which is capable of separating the horizontal and vertical sync in the presence of extremely large amounts of noise. Therefore, at junction 17, which is connected to the output of the sync separator 16, only the vertical and horizontal sync signal portions from the remote signal are present. These sync signal portions are fed into a vertical integrator 18 which removes the horizontal component of the sync signal and produces a pulse on its output at the vertical sync interval. In other words, a junction 19 there is a pulse which occurs in phase with the vertical sync signal portion from the remote composite video signal. This vertical pulse is applied to the input of a vertical phase comparator 20 to be compared with a local vertical pulse coming from a pulse forming circuit 21 which forms part of the local sync generator 22. The pulse coming from the pulse forming circuit 21 over lead 23 is three horizontal scan lines long. As long as the vertical pulse at junction 19 coming into the vertical phase comparator 20 falls within the three horizontal line period of the local pulse coming in on lead 23 the vertical sync portions of the remote video signal and the local sync generator 22 are in phase synchronism. If the signal coming in on lead 19 falls outside of the 3Hz interval pulse being fed into the comparator over lead 23 an output pulse is generated by the phase comparator 20 and supplied over lead 24 to any suitable conventional divider chain, generally designated by character 25 to reset such to bring the two vertical sync signals back into phase synchronism.

The divider chain 25 is composed of standard digital logic cards and the dividers are actually conventional flip-flops which are programmed in such a way to divide by 525. Such digital cards can be purchased from Computer Control Company of Framingham, Mass. The reset pulse coming in on lead 24 is actually applied to the reset input of the individual flip-flops which compose the divider chain. The reset pulses are selectively applied into each component of the divider chain so that it resets to a count which will bring the two vertical pulses back into phase synchronism. Such divider chain could be composed of any suitable conventional digital cards.

The details of the sync generator enclosed in the broken lines will not be discussed since such is a conventional EIA sync generator, but will be briefly described in order to present a better understanding of such. The divider chain 25 is composed of a divide by 7 block 26, a divide by 5 block 27, another divide by 5 block 28, and a divide by 3 block 29. These blocks are shown tied together by leads 30, 31 and 32, respectively, so that if a 31,500 Hz signal is applied at one end a 60 Hz signal is produced at the lower end. It is noted that the reset pulse coming in on lead 24 is also fed into each of the divider blocks. Thus, when a reset signal comes in on lead 24 it is fed to the appropriate divider block to reset the sync generator to its initial condition when the signal being fed over lead 23 into the vertical phase comparator is not in phase with the remote vertical sync signal coming into the phase comparator 20 over lead 19. Therefore, the local and remote signals are maintained in vertical phase synchronism.

It is, also, extremely important that the horizontal sync signal produced by the local sync generator 22 be in phase-lock with the horizontal sync portion of the remote signal so that all the ground recording and monitoring equipment can be slaved to the remote master oscillator and be presented with a video signal having clean sync regardless of the signal-to-noise quality of the received signal. In order to accommodate such, a circuit constructed in accordance with the present invention includes a second order phase-locked loop, generally designated by the reference character 33. When a loss of signal occurs, it is possible for the second order phase-locked loop 33 to automatically reassume a locked condition almost instantaneously without a slipping cycles when the remote signal reappears. This fast acquisition can be assured for a properly designed second order loop if the frequency difference between the remote input signal and the loop voltage control oscillator 34 does not exceed the phase-locked loop pull in range and the maximum rate of change of the input signal does not exceed the loop bandwidth. Since the looped bandwidth is a function of input signal-to-noise ratio, the lock-in range of the loop will decrease with decreasing signal-to-noise ratios. Thus, as can be seen, in order to reinsert clean sync to the video signal, the local sync generator 22 must be sync-locked to the video input.

Referring to FIG. 1, it can be seen that the signal at junction 17, which includes the horizontal and vertical sync portion of the remote signal is applied to an input 35 of the phase detector 36. A local horizontal sync signal is also applied to the phase detector via lead 37 coming out of the sync generator 22, and the sawtooth generator 38. The output of the sawtooth generator 38 is coupled to the input to the phase detector 36 by means of lead 39. If the signal coming in on lead 39 is in phase with the signal coming in on 35 to the phase detector 36, then there will be no error signal on the output lead 40. This condition of zero phase error takes place when both the local horizontal sync and the remote horizontal sync signals are in phase. The sawtooth generator 38 is sampled at the zero voltage point and no output signal appears when the two signals are in phase.

Any difference in the frequencies between the local horizontal sync signal and the remote horizontal sync signal causes a voltage output on lead 40. This voltage output is sent to a loop filter block 41 which establishes the bandwidth of the phase-locked lop loop. The bandwidth can be changed by changing the value of the resistors 42 and 43. It is noted that the resistor 42 is a series resistor, while resistor 43 is connected in shunt therewith to one side of capacitor 44 which has its other side grounded. An advantage of using a wide bandwidth is that such makes the system more suitable for acquisition and tracking. A narrower bandwidth is used when it is desired to reduce signal jitter under very low signal-to-noise conditions which results in a more stable presentation of the signal to the video monitors and tape recorders. One advantage of using the wide bandwidth is that lock is lock is almost instantaneously accomplished for all but the most abnormal operating conditions.

The output of the loop filter 41 is applied by means of lead 45 to the control input of the 31.5 KiloHertz voltage control oscillator 34. The input voltage being applied to the voltage controlled oscillator 34 by means of lead 45 will change the frequency of the oscillator so that such, in turn, changes the output frequency of the sync generator 22 which is fed over lead 37 through the sawtooth generator 38 to the phase detector 39 in order to bring the local horizontal sync signal in phase with the remote horizontal sync signal. Therefore, there is a closed loop which maintains the local and remote horizontal sync signals in synchronism. It is necessary that the remote and local horizontal sync signals always be in phase synchronism so that the local sync and blanking can be reinserted in the video switchers at the same place as the original sync and blanking components of the remote signal.

As can be seen, the 31.5 kiloHertz signal being supplied from the oscillator 34 is fed via lead 46 into a divider 47 enclosed within the sync generator 22 to divide the signal in half so that a 15,750 Hertz signal is applied on the output lead 37 to be compared in the phase detector 36.

The sync generator 22 also has pulse forming circuits 21 which give out the standard EIA composite sync signal on lead 48, a mixed blanking pulse on lead 49, the horizontal and vertical sync signals, and a 3 horizontal scan line duration vertical pulse on lead 23.

The signals coming out of the pulse forming circuits 21 forming a part of the sync generator 22 range from 0 to minus 6 volts, whereas, the sync portion of the remote video signal is approximately 0.3 volt peak to peak, therefore, there has to be an interface between the remote video sync signal portion and the local sync signal portion. One way of doing this is supplying the local composite sync signal and the mixed blanking signal by means of leads 48 and 59 to a DC reference block. A signal which is the average DC level of the remote video signal is supplied from the video amplifier 13 by means of lead 51*a* to an input of the DC reference block 51 which acts as a reference for reducing the amplitude of the signals coming from the pulse forming circuits 21 so that the local sync and blanking signals are adaptable with the amplitude of remote composite video signals. In other words, the DC reference block 51 uses the average DC level from the video amplifier 13 coming in on line 51*a* to change the amplitude of the signals coming on lines 48 and 49 from the local sync generator so that on the output line 52 we have a local sync and blanking signal which is compatible both in amplitude and DC level to the input signals being supplied to the video switchers 53, 54 and 55 from the video amplifier 13.

The video switchers and decommutators 53 and 54 may be any suitable conventional switcher and aie provided for decommutating the remote video signal, as well as reinserting a clean sync and blanking signal into the composite signal. The video switcher 55 only reinserts a clean sync and blanking signal into the composite signal. Frequently, in space vehicles there are more than one camera aboard for monitoring the operation of different components, such as the engines, etc. In order to use a single transmitter the signals are commutated so that the composite signal includes alternate frames from the two cameras. Thus, when the signal is received it is first decommutated and then sent to the desired monitoring station. This is accomplished in the switchers 53 and 54. The commutated remote video signal is fed from the video amplifier 13 by leads 56 and 57 to the video switchers 53 and 54. By alternately switching the video switchers on and off in synchronism with the switching rate of the commutated signal, a decommutated signal is produced at the output of the switchers 53 and 54 on leads 60 and 61, respectively. Clean sync and blanking are reinserted in the decommutated outputs in the same manner as in video switcher 55.

The operation of the video switcher and sync reinserter 55 will be discussed first. The composite video signal is applied from the amplifier 13 through lead 58 to an input of the video switcher 55. On lead 52 coming into the video switcher 55 is the local sync and blanking signal which is to be substituted for the sync and blank portion of the remote signal coming in on lead 58. Actually, the blank portion referred to in the signal is just the interval between the video information coming in from the remote station. Thus, it is desirable to not only replace the sync with a clean sync, it is also desirable to make certain no noise or information is carried in the gap or blank the video information. Therefore, a clean blanking pulse is also applied with the local sync. On leads 62 and 63 leading into the video switcher is a blanking pulse and its complement which is used to generate a control logic signal in the switching circuit 55 which, in turn, controls the reinsertion of the local sync and blanking signal coming in on lead 52. The blanking signal which is fed in on lead 62 is taken from lead 49 coming from the pulse forming circuit 21 labeled mixed blanking. On lead 62 the blanking signal is inverted first by an inverter 64 to produce the complement of the blank signal on lead 62 entering in the video switcher. The video switcher may be any suitable standard circuit which is capable of blanking a portion of the composite signal so that a clean sync and blanking signal can be reinserted.

At the output of the video switcher 55 a clean composite signal is supplied to lead 65 and is fed into a plurality of emitter followers 66 for being subsequently fed to any suitable monitoring system, such as tape recorders and video monitors, coupled to the output thereof. The video switchers 53 and 54 operate in the same manner as the video switcher 55 except switching pulses are supplied thereto so that they also decommutate the commutated signals coming in on leads 56 and 57 from the video amplifier. If the signal is not a commutated signal, then such would be fed straight through the video switcher 55. Switching signals are supplied over leads 67 and 68 from the decom divider for alternately switching on switchers 53 and 54, respectively. Thus, alternate frames or multiples thereof, will appear on the outputs 60 and 61 of the switchers 53 and 54, respectively. Therefore, only signals produced by one camera will appear at the output of the video switcher 53, while the frames produced by the other camera at the remote station will appear on the output of 54. The rate that the switching operation takes place is synchronized with the cameras at the remote station. A reference voltage is also supplied to the video switchers and decommutators 53 and 54 from the output of the DC reference block 51 over lead 59. The purpose of the reference voltage is to provide a voltage level for the video switcher to return to during the time the camera in which it is monitoring is off. In other words, during the decommutation operation the video switchers 53 and 54 are alternately turned on and off. During the off period, that is, during the period when the particular switcher is not transmitting a video signal therethrough, the switcher is returned to the reference voltage level supplied over lead 59 from the DC reference source 51. The reference level occurs only during each video line interval. Clean sync and blanking are still present in the output during the off camera periods. The DC reference voltage coming in on lead 59 into the video switching decommutators 53 and 54 is an average voltage that is received in the video amplifier 13 and fed by lead 51*a* to the DC reference 51.

The video signals on the output leads 60 and 61 are also fed to emitter followers 66 to be applied to any suitable monitoring apparatus. It is to be understood that the video switchers 53 and 54 operate in the same manner as the video switcher 55 as far as reinserting a clean local sync and blanking pulse is concerned, plus they decommutate the incoming signal, if such is necessary.

A 60 cycle signal is supplied from the base of the divider chain 25 which forms part of the sync generator over lead 70 to the decom divider 69 for use as the decommutating formats. That is, producing the switching signals on the output leads 67 and 68. For the purpose of explaining the operation of such, it is assumed that the remote signals being received includes alternate signals from a pair of cameras A and B carried in the remote space vehicle. As previously mentioned, the decom divider 69 produces signals on its output to alternately switch on and off switchers 53 and 54 so that only signals from the camera A appear on output lead 60 and only signals from camera B appear on output lead 61 from the switchers 53 and 54, respectively. However, in addition to decommutating the signals the switching signals at the output of the decom divider 69 must be in phase correlation. This is accomplished by placing a signal at the beginning of vertical sync portion of the remote signal from camera A. Normally, this signal is a 1½ megaHertz signal superimposed on horizontal scan lines 19, 20 and 21, of camera A. Therefore, it would have a duration of three lines of horizontal scan. This signal is supplied over lead 71 leading from the video amplifier 13 into any suitable conventional burst recognizer 72. The signal is detected in the burst recognizer 72 and generates a pulse output which occurs in time with the 1 ½megacycle signal which is sent at the start of each reference camera vertical format. In this particular example, such is camera A. The output pulse which is generated by the burst recognizer 72 is applied to the output lead 73 to the decom divider 69 to reset the divider if such is out of phase in order to keep the video outputs from video switcher blocks 53 and 54 in synchronism. In other words, this maintains the correct camera signal on each output 60 and 61 so that the two signals from camera A and B are not intermingled.

The 60 cycle signal coming out of the sync generator 22 on lead 70 is also applied by lead 74 to any suitable conventional camera drive circuit 75 which generates a camera drive signal on its output lead 76. The camera drive circuitry 75 filters the 60 cycle signal and generates a sign wave camera drive signal of approximately 5 to 8 volts, which appears on the output lead 76. This is used in television kinescope systems which require a 60 Hertz coherent signal with the video for operating the film camera on a TV kinescope system.

The circuitry has been shown in block form, and any suitable circuit could be used for producing the results obtained by the individual designated blocks.

In summarizing the operation of the video sync processor, it will take a signal from a remote station and remove the sync portion of the signal, as well as the blank portion between the video information signals and substitute a clean local sync and blanking signal therefor. The system will also decommutate any commutated signal coming in, depending upon the format of incoming signals. At any time there is a useful video signal being received there will be horizontal and vertical sync lock due to the second order phase-locked loop.

While a preferred embodiment of the invention has been described using specific terms, such description is for illustrative purposes only, and it is to be understood that changes and variations may be made without departing from the spirit or scope of the following claims.

We claim:

1. A system for removing the vertical and horizontal sync signal portions from a composite video signal received from a remote station such as a space vehicle and reconstructing the signal with a new clean sync signal portion comprising:

A. a sync separator;

B. means for supplying said remote composite signal to said sync separator for separating the horizontal and vertical sync signal portions from said composite signal;

C. a local sync generator producing local sync and blanking signals;

D. a voltage controlled oscillator coupled to the input of said local sync generator for providing an input signal thereto:

E. a phase detector coupled to said output of said sync separator for receiving the horizontal sync portion of said remote composite video signal;

F. means for supplying said local sync signal to said phase detector to be compared with said horizontal sync portion of said remote composite video signal;

G. said phase detector generating an output signal indicating the frequency difference between said local sync signal and said horizontal sync portion of said remote signal;

H. means for coupling said signal indicating the frequency difference to said voltage controlled oscillator for changing the frequency of said voltage controlled oscillator which makes the local sync generator come back in phase with said remote horizontal sync signal;

I. means for including a loop filter for maintaining the frequency of said voltage controlled oscillator near its normal operating value when said remote signal is temporarily lost;

J. a video switcher having an input means for receiving blanking pulses and sync signals;

K. input means for coupling said remote composite signal to said video switcher;

L. means for coupling said local sync and blanking signals from said sync generator to said video switcher for removing said sync signals from said remote composite video signal and combining said local sync with the video portion of said remote composite video signal;

M. a vertical integrator;

N. a vertical phase comparator coupled to the input of said integrator;

O. means for coupling said remote vertical sync signal portion from said sync separator to said vertical phase comparator through said integrator;

P. means for supplying a local vertical signal from said sync generator to said vertical phase comparator to be compared with said remote vertical sync signal portion; and Q. means for coupling the output of said vertical phase comparator to said sync generator for resetting said sync generator when said local vertical signal is out of phase with said remote vertical sync signal portion to synchronize said local sync signal with said remote vertical sync signal portion.

2. The system as set forth in claim 1 wherein said remote video signal is a commutated signal and further comprising:

A. a plurality of combined video switchers and decommutators;

B. means for supplying said commutated signal to said combined video switchers and decommutators;

C. means for supplying a switching signal to said combined video switchers and decommutators for causing said remote video signal to be decommutated; and D. means for coupling said local sync and blanking signals from said sync generator to said combined video switchers and decommutators for cancelling said signals from said remote composite video signal and combining said local sync with the video portion of said decommutated signals.